United States Patent
Nakagawa et al.

(10) Patent No.: US 11,060,452 B2
(45) Date of Patent: Jul. 13, 2021

(54) TURBOCHARGER

(71) Applicant: KOJIMA INDUSTRIES CORPORATION, Toyota (JP)

(72) Inventors: Takuya Nakagawa, Toyota (JP); Shinji Kuraoka, Toyota (JP)

(73) Assignee: KOJIMA INDUSTRIES CORPORATION, Toyota (JP)

( * ) Notice: Subject to any disclaimer, the term of this patent is extended or adjusted under 35 U.S.C. 154(b) by 0 days.

(21) Appl. No.: 16/597,446

(22) Filed: Oct. 9, 2019

(65) Prior Publication Data
US 2020/0116083 A1 Apr. 16, 2020

(30) Foreign Application Priority Data

Oct. 10, 2018 (JP) .............................. JP2018-191385

(51) Int. Cl.
*F02C 6/12* (2006.01)
*F01D 25/24* (2006.01)
*F02B 37/18* (2006.01)

(52) U.S. Cl.
CPC .............. *F02C 6/12* (2013.01); *F01D 25/243* (2013.01); *F02B 37/183* (2013.01); *F05D 2220/40* (2013.01); *F05D 2240/55* (2013.01)

(58) Field of Classification Search
CPC .......... F02C 6/12; F01D 25/243; F02B 37/16; F02B 37/162; F02B 37/164; F02B 37/168; F02B 37/18; F02B 37/183; F02B 37/186; F05D 2220/40; F05D 2240/55; F04D 27/009; F04D 27/0207; F04D 27/0215
See application file for complete search history.

(56) References Cited

U.S. PATENT DOCUMENTS

| 5,173,021 A | * | 12/1992 | Grainger | ............. F04D 27/0215 |
| | | | | 415/119 |
| 2016/0258447 A1 | * | 9/2016 | Day | ........................ F02C 7/045 |

FOREIGN PATENT DOCUMENTS

JP 2014141904 A 8/2014

* cited by examiner

*Primary Examiner* — Jesse S Bogue
*Assistant Examiner* — Loren C Edwards
(74) *Attorney, Agent, or Firm* — Hunton Andrews Kurth LLP

(57) ABSTRACT

A turbocharger including a compressor housing, a flange, an air bypass valve and a seal. The compressor housing has an impeller housing, an upstream passage positioned upstream of the impeller housing and a downstream passage positioned downstream of the impeller housing. The flange is coupled to the compressor housing and has a bypass passage connected to the downstream passage of the compressor housing and the upstream passage of the compressor housing. A groove is formed at a surface of the flange opposing the compressor housing and the seal is fitted into the groove. Therefore, a tight seal of the flange and the compressor housing can be ensured by the seal. Further, the air bypass valve is coupled only to the flange. Therefore, a tight seal of the turbocharger can be ensured easier than in a case where the air bypass valve is coupled over the flange and the compressor housing.

6 Claims, 10 Drawing Sheets

TURBOCHARGER

This application claims priority to Japanese Patent Application No. 2018-191385, filed in Japan on Oct. 10, 2018, the entire contents of which are hereby incorporated by reference.

TECHNICAL FIELD

The present invention relates to a turbocharger.

BACKGROUND

As illustrated in FIGS. 9 and 10, Japanese Patent Publication No. 2014-141904 discloses a compressor housing 1 having a main body piece 2 and a divided piece 3. A groove 2a is formed in the main body piece 2. A bypass passage 4 is formed by press-fitting the divided piece 3 into the groove 2a.

However, there are the following problems with the structure disclosed in the Patent Document above:
Though the divided piece 3 is press-fitted into the main body piece 2, since the divided piece 3 and the main body piece 2 are formed separately and fixed to each other, a groove or a step is formed between the divided piece 3 and the main body piece 2 that cannot be completely eliminated.
Therefore, it is difficult to couple an air bypass valve over these parts 2, 3 and to ensure a tight seal of the air bypass valve and these parts 2, 3.

Patent Document

Patent Document 1: JP2014-141904

BRIEF SUMMARY

An object of one embodiment of the invention is to provide a turbocharger including a tight seal that can be easily ensured.

Solutions

In order to achieve the above-described object, embodiments of the present invention can include the following aspects:
(1) A turbocharger having the following structures:
The turbocharger comprises a compressor housing, a flange, an air bypass valve and a seal.
The compressor housing has an impeller housing having a space where an impeller is disposed, an upstream passage positioned upstream of the impeller housing and a downstream passage positioned downstream of the impeller housing.
The flange is coupled to the compressor housing and has an internal passage positioned upstream of the upstream passage of the compressor housing and a bypass passage connected to the downstream passage of the compressor housing and the upstream passage of the compressor housing.
The air bypass valve is coupled only to the flange so as to be able to open and close the bypass passage.
The downstream passage of the compressor housing has an outlet passage and a connecting passage which is connected to the bypass passage.
The flange has a surface opposing the compressor housing and a groove is formed at the surface.
The seal is fitted into the groove.

(2) The turbocharger according to item (1) having the following structures:
The bypass passage has a bypass-upstream passage connected to the connecting passage of the compressor housing and a bypass-downstream passage located radially outside the bypass-upstream passage and connected to the upstream passage of the compressor housing.
(3) The turbocharger according to item (2) having the following structures:
The groove has a small-diameter groove portion, a large-diameter groove portion, a first connecting groove portion and a second connecting groove portion, the small-diameter groove portion formed at a surrounding portion of the bypass-upstream passage and formed continuously over an entire circumference thereof, the large-diameter groove portion formed at a surrounding portion of the internal passage of the flange and having a form obtained by cutting off a portion of a circumference thereof, the first connecting groove portion formed at one side of the bypass-downstream passage and connected to a first portion of the small-diameter groove portion and one circumferential end of the large-diameter groove portion, the second connecting groove portion formed at the other side of the bypass-downstream passage and connected to a second portion of the small-diameter groove portion and the other circumferential end of the large-diameter groove portion.
(4) The turbocharger according to item (3) having the following structures:
The seal has a small-diameter seal portion fitted into the small-diameter groove portion, a large-diameter seal portion fitted into the large-diameter groove portion, a first connecting seal portion fitted into the first connecting groove portion and a second connecting seal portion fitted into the second connecting groove portion.
The seal is molded to a single, integral member.
(5) The turbocharger according to item (1) having the following structures:
The flange has a cylindrical portion inserted into the upstream passage of the compressor housing and having an internal space connected to the internal passage of the flange.
(6) The turbocharger according to item (5) having the following structures:
A notch is formed at a portion of the cylindrical portion in a circumferential direction of the cylindrical portion.
(7) The turbocharger according to item (1) having the following structures:
The compressor housing has a contact surface to which the seal is contacted.
The contact surface is a flat surface.
(8) The turbocharger according to item (1) having the following structures:
The upstream passage of the compressor housing and the connecting passage of the compressor housing extend in the same direction and open to the flange side.

Technical Advantages

According to the turbocharger according to items (1)-(8) above, since the groove is formed at the surface of the flange opposing the compressor housing and the seal is fitted into the groove, a tight seal of the flange and the compressor housing can be ensured by the seal.
Further, since the air bypass valve is coupled only to the flange, a groove or a step affecting a tight seal can be eliminated or can be made extremely small. Therefore, a tight seal of the turbocharger can be ensured easier than in a case where the air bypass valve is coupled to over the flange and the compressor housing.

According to the turbocharger according to item (3) above, since the groove has the small-diameter groove portion, the large-diameter groove portion, the first connecting groove portion and the second connecting groove portion and the seal is fitted into the groove, the tight seal of the flange and the compressor housing can be ensured.

According to the turbocharger according to item (4) above, since the seal is molded to a single, integral member, a manufacturing cost can be decreased compared with a case where the seal is composed of a plurality of parts.

According to the turbocharger according to item (5) above, since the flange has the cylindrical portion inserted into the upstream passage of the compressor housing, the flange can be easily positioned to a predetermined position relative to the compressor housing by using the cylindrical portion.

According to the turbocharger according to item (6) above, since the notch is formed at the cylindrical portion, the bypass passage and an internal space of the cylindrical portion can be connected to each other through the notch.

According to the turbocharger according to item (7) above, since the contact surface of the compressor housing is a flat surface, the tight seal of the flange and the compressor housing can be easily ensured by the seal.

According to the turbocharger according to item (8) above, since the upstream passage of the compressor housing and the connecting passage of the compressor housing extend to the same direction and open to the flange side, it is possible to suppress the connecting passage from having an undercut shape when the compressor housing is molded. Therefore, a manufacturing cost of the compressor housing can be decreased.

DETAILED DESCRIPTION

A turbocharger according to certain embodiments of the present invention will be explained below with reference to FIGS. 1-8.

Figure 2:
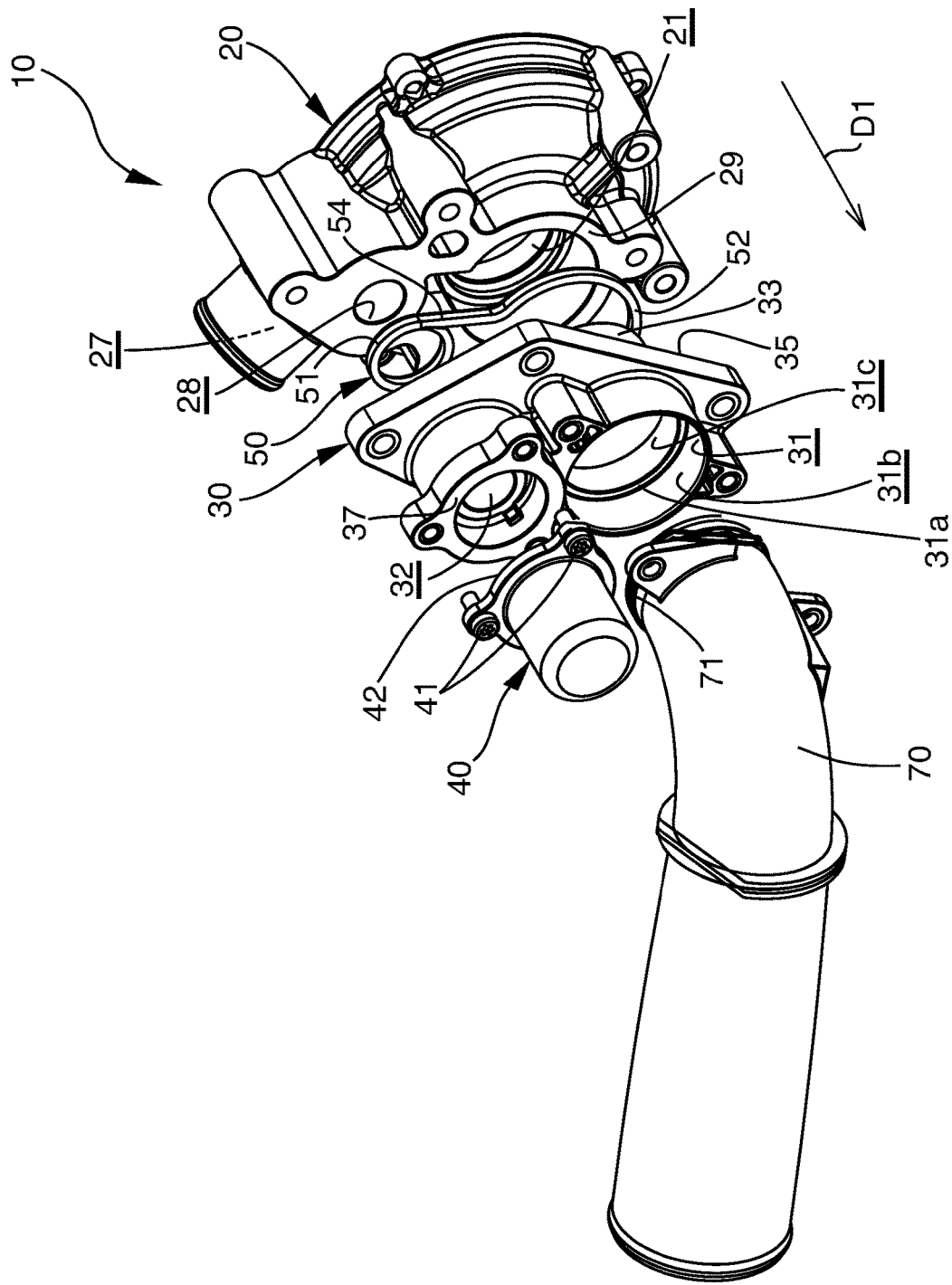
FIG. 2 is a perspective view of the turbocharger where parts are decoupled from each other, according to the first embodiment of the present invention.

As illustrated in FIG. 2, a turbocharger 10 according to the present invention has a compressor housing 20, a flange 30 having a bypass passage 32, an air bypass valve 40 and a seal 50.

Figure 3:
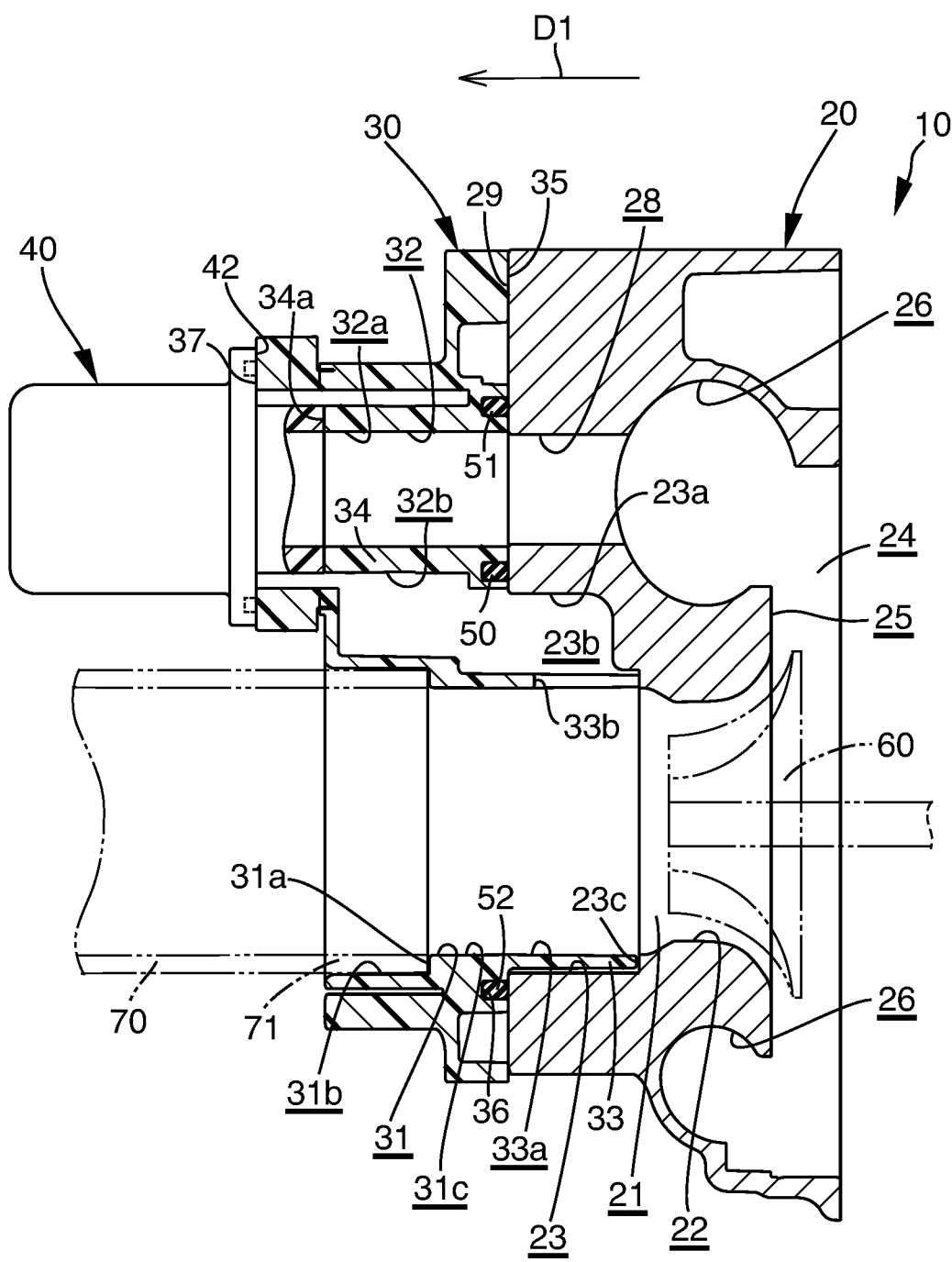
FIG. 3 is an enlarged cross-sectional view of the turbocharger when the air bypass valve is a closed position.

The compressor housing 20 is made from aluminum alloy and is a die cast member. As illustrated in FIG. 3, the compressor housing 20 has an intake passage 21 where air flows through therein. The intake passage 21 has an impeller housing 22 having a space where an impeller 60 is disposed, an upstream passage 23 positioned upstream of the impeller housing 22 and a downstream passage 24 positioned downstream of the impeller housing 22.

The upstream passage 23 extends from the impeller housing 22 to a direction close to the flange 30 in an axial direction of the impeller 60. In the description below, the direction in which the upstream passage 23 extends from the impeller housing 22 is defined as D1. The upstream passage 23 opens in the direction D1. A recess 23a is formed at the compressor housing 20 so that a cross-sectional area of the upstream passage 23 increases. An internal space 23b of the recess 23a is a portion of the upstream passage 23.

The downstream passage 24 has a diffuser section 25, a compressor chamber 26, an outlet passage 27 and a connecting passage 28.

The diffuser section 25 is connected to the impeller housing 22. Air is pressurized in the diffuser section 25. The compressor chamber 26 is connected to the diffuser section 25. The compressor chamber 26 is formed radially outside the impeller housing 22 and extends to a circumferential direction thereof. The outlet passage 27 is connected to the compressor chamber 26 at a first portion of the compressor chamber 26. Air in the compressor chamber 26 flows through the outlet passage 27 to an engine (not shown).

The connecting passage 28 is connected to the compressor chamber 26 at a second portion of the compressor chamber 26. The connecting passage 28 is connected to the bypass passage 32 of the flange 30. The connecting passage 28 extends in the direction D1 from the compressor chamber 26 and opens in the direction D1. That is, the connecting passage 28 and the upstream passage 23 extend in the same direction D1 and open in the same direction D1.

The flange 30 is made from resin and is an injection molded member. Alternatively, the flange 30 may be made from aluminum alloy and may be a die cast member. The flange 30 is molded to a single, integral member. The flange 30 has an internal passage 31, the bypass passage 32 and a cylindrical portion 33.

The internal passage 31 of the flange 30 is positioned upstream of the upstream passage 23 of the compressor housing 20. The internal passage 31 extends straight in the direction D1. A step 31a is provided at an intermediate portion of the internal passage 31 in the longitudinal direction (direction D1) of the internal passage 31. Due to the step 31a, the internal passage 31 has a large-diameter portion 31b and a small-diameter portion 31c, the large-diameter portion 31b being positioned farther from the compressor housing 20 than the step 31a, the small-diameter portion 31c being positioned closer to the compressor housing 20 than the step 31a. An inner diameter of the large-diameter portion 31b is larger than that of the small-diameter portion 31c. An inlet duct 70 is inserted into the large-diameter portion 31b at a downstream end portion 71 of the inlet duct 70. The inlet duct 70 is coupled to the flange 30 using a bolt (not shown).

The bypass passage 32 is provided in order to suppress an occurrence of a phenomenon (surging phenomenon) in which an internal pressure of the downstream passage 24 increases and air in the downstream passage 24 flows backward to the upstream passage 23. The bypass passage 32 is connected to the downstream passage 24 and the upstream passage 23. More particularly, the bypass passage 32 is connected to the connecting passage 28 of the compressor housing 20 and the internal space 23b of the recess 23a of the compressor housing 20.

Since the bypass passage 32 is provided, a part of the air in the downstream passage 24 of the compressor housing 20 can be returned to the upstream passage 23 of the compressor housing 20 without flowing through the impeller housing 22.

The bypass passage 32 has a bypass-upstream passage 32a connected to the connecting passage 28 of the compressor housing 20 and a bypass-downstream passage 32b connected to the upstream passage 23 of the compressor housing 20. The bypass-upstream passage 32a extends straight in the direction D1. The bypass-upstream passage 32a is an internal space of a pipe-shaped portion 34 provided at the flange 30. The bypass-downstream passage 32b is located radially outside the bypass-upstream passage 32a. Air having flowed into the bypass-upstream passage 32a from the connecting passage 28 of the compressor housing 20 flows through the bypass-upstream passage 32a to the bypass-downstream passage 32b and then to the upstream passage 23 (more particularly, the internal space 23b of the recess 23a) of the compressor housing 20.

The cylindrical portion 33 extends in a direction opposite to the direction D1. The cylindrical portion 33 is inserted into the upstream passage 23 of the compressor housing 20. A tip of the cylindrical portion 33 contacts a step 23c provided at the upstream passage 23 of the compressor housing 20. The cylindrical portion 33 has an internal space 33a connected to the internal passage 31 of the flange 30.

A notch 33b is formed at a portion of the cylindrical portion 33 in a circumferential direction of the cylindrical portion 33. Since the notch 33b is formed, the internal space 23b of the recess 23a of the compressor housing 20 and the internal space 33a of the cylindrical portion 33 can be connected to each other through the notch 33b.

Figure 4:
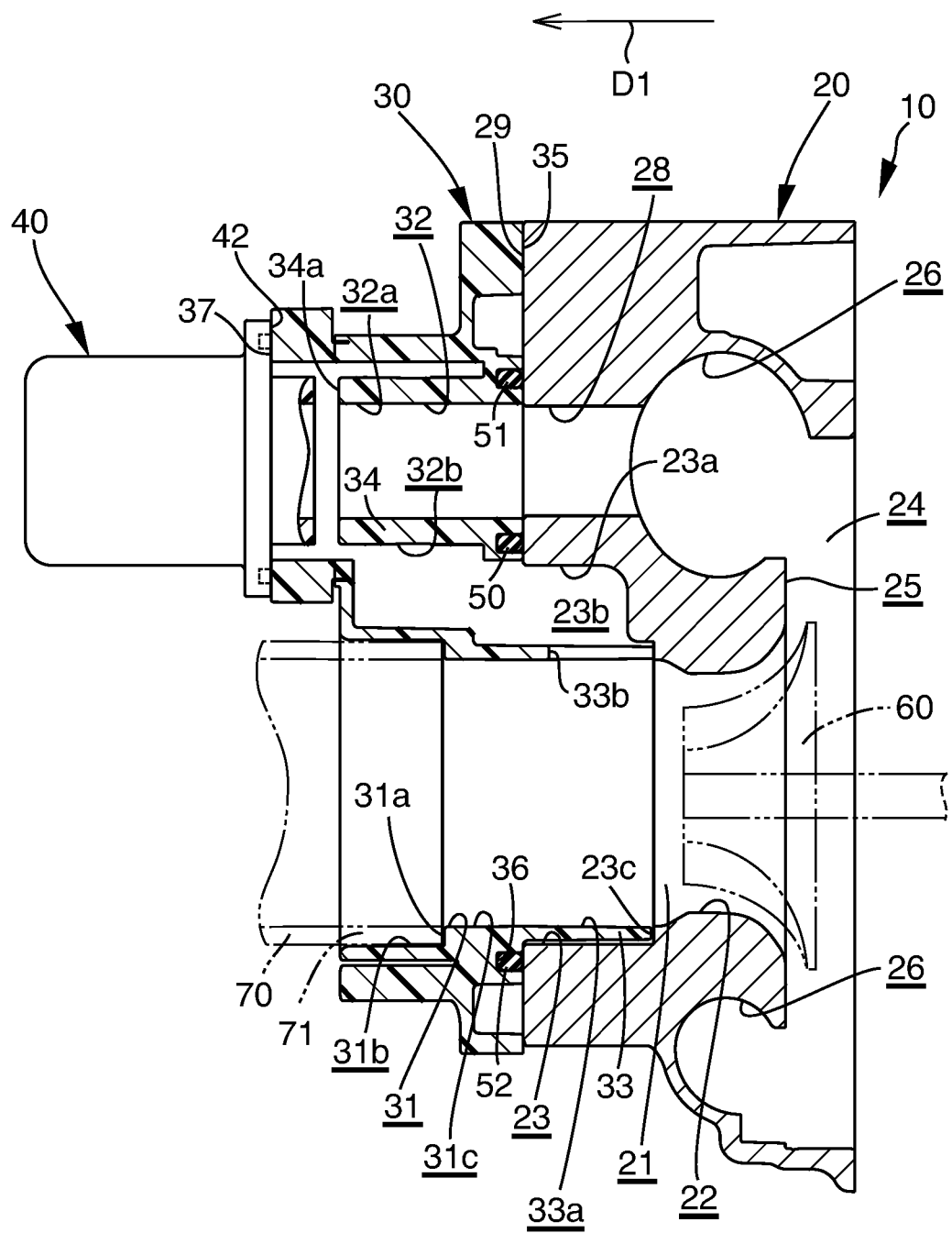
FIG. 4 is an enlarged cross-sectional view of the turbocharger when the air bypass valve is an open position.
Figure 5:
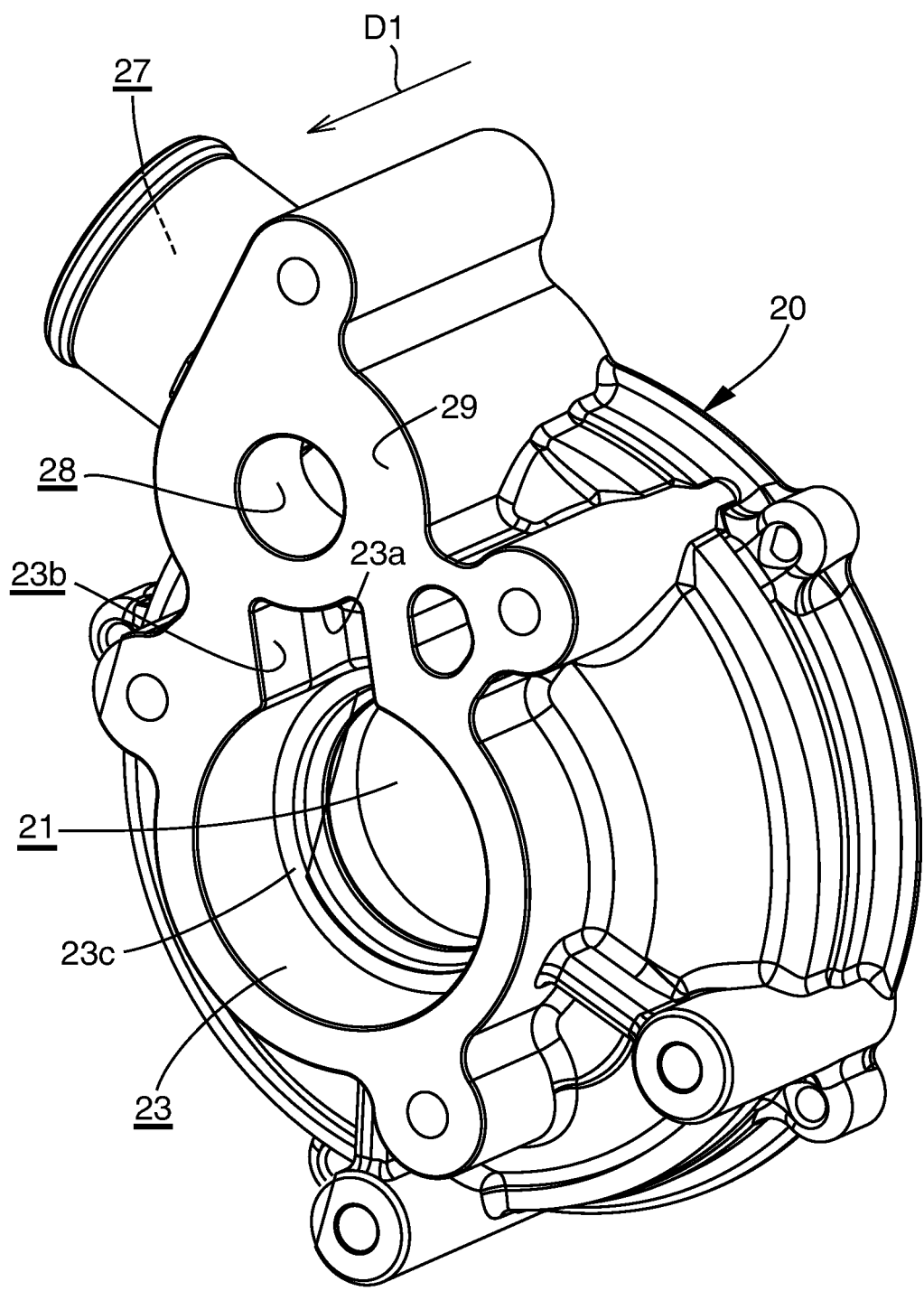
FIG. 5 is an enlarged perspective view of the compressor housing of the turbocharger according to the first embodiment of the present invention.
Figure 6:
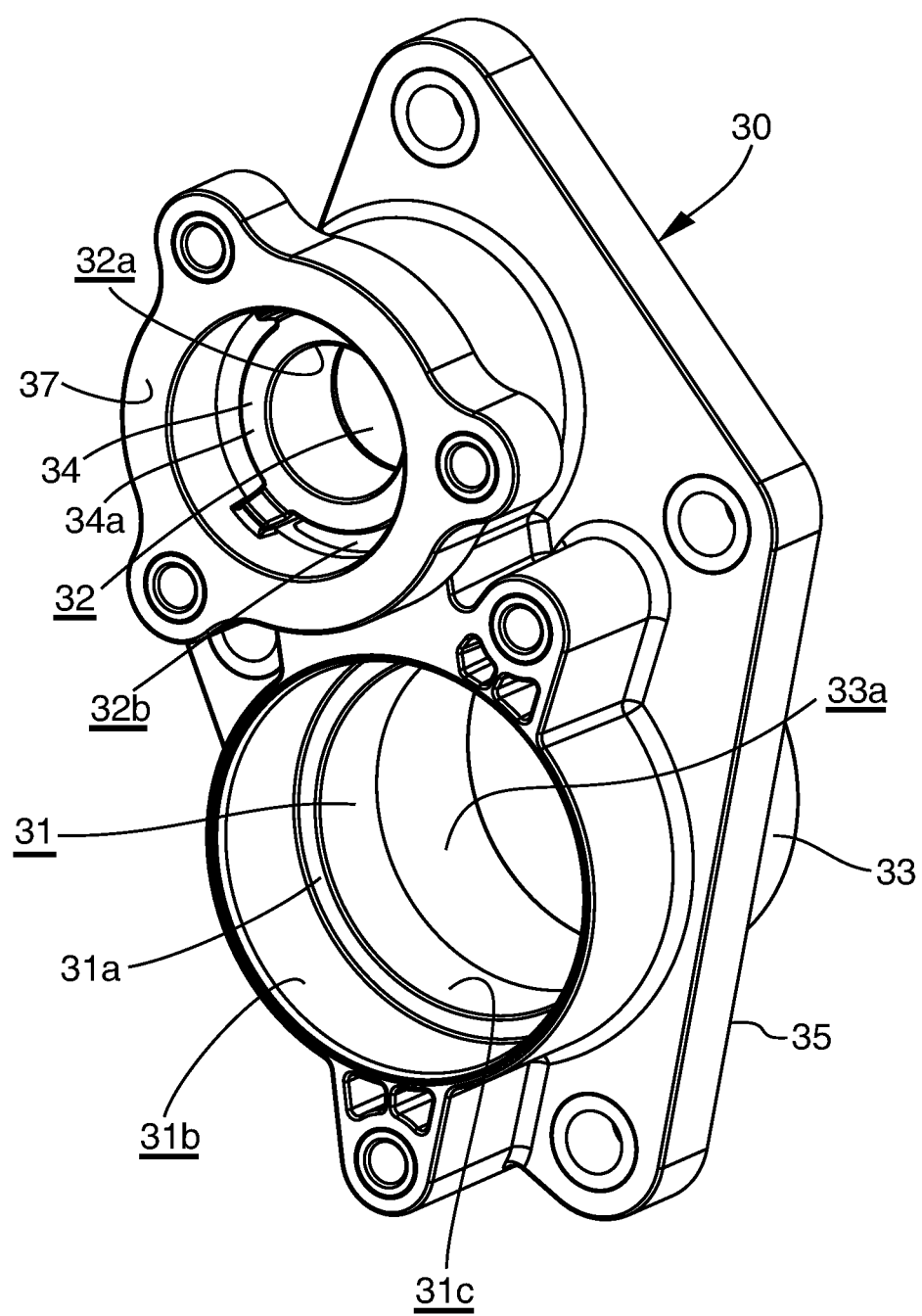
FIG. 6 is an enlarged perspective view of the flange of the turbocharger according to the first embodiment of the present invention.

The air bypass valve 40 is able to open and close the bypass passage 32. The air bypass valve 40 is provided so as to be able to contact an end surface 34a of the pipe-shaped portion 34 of the flange 30. When the air bypass valve 40 contacts the end surface 34a of the pipe-shaped portion 34, the flow of air from the bypass-upstream passage 32a to the bypass-downstream passage 32b is blocked. As illustrated in FIG. 4, when the bypass valve 40 is away from the end surface 34a of the pipe-shaped portion 34, the flow of air from the bypass-upstream passage 32a to the bypass-downstream passage 32b is allowed.

Figure 1:
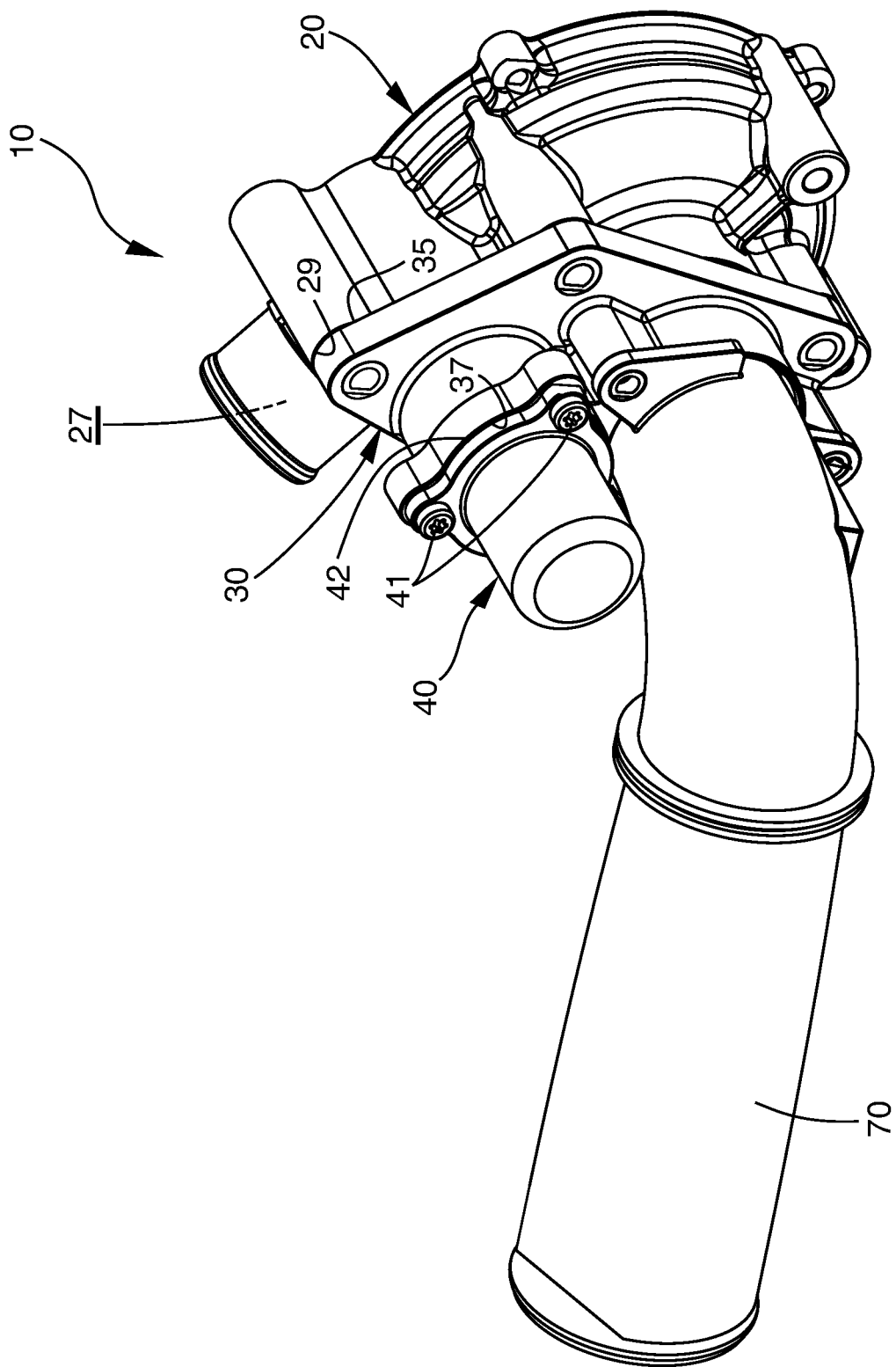
FIG. 1 is a perspective view of the turbocharger according to a first embodiment of the present invention.

As illustrated in FIGS. 1 and 2, the air bypass valve 40 is coupled only to the flange 30 using a bolt 41. A seal rubber (not shown) is provided at a surface 42 of the air bypass valve 40 opposing the flange 30 in order to ensure a tight seal of the air bypass valve 40 and the flange 30. This seal rubber (not shown) contacts a valve seating surface 37 provided at the flange 30. The valve seating surface 37 opposes to the surface 42 of the air bypass valve 40. The valve seating surface 37 is a flat surface whereby the tight seal of the air bypass valve 40 and the flange 30 can be easily ensured by the seal rubber (not shown).

Figure 7:
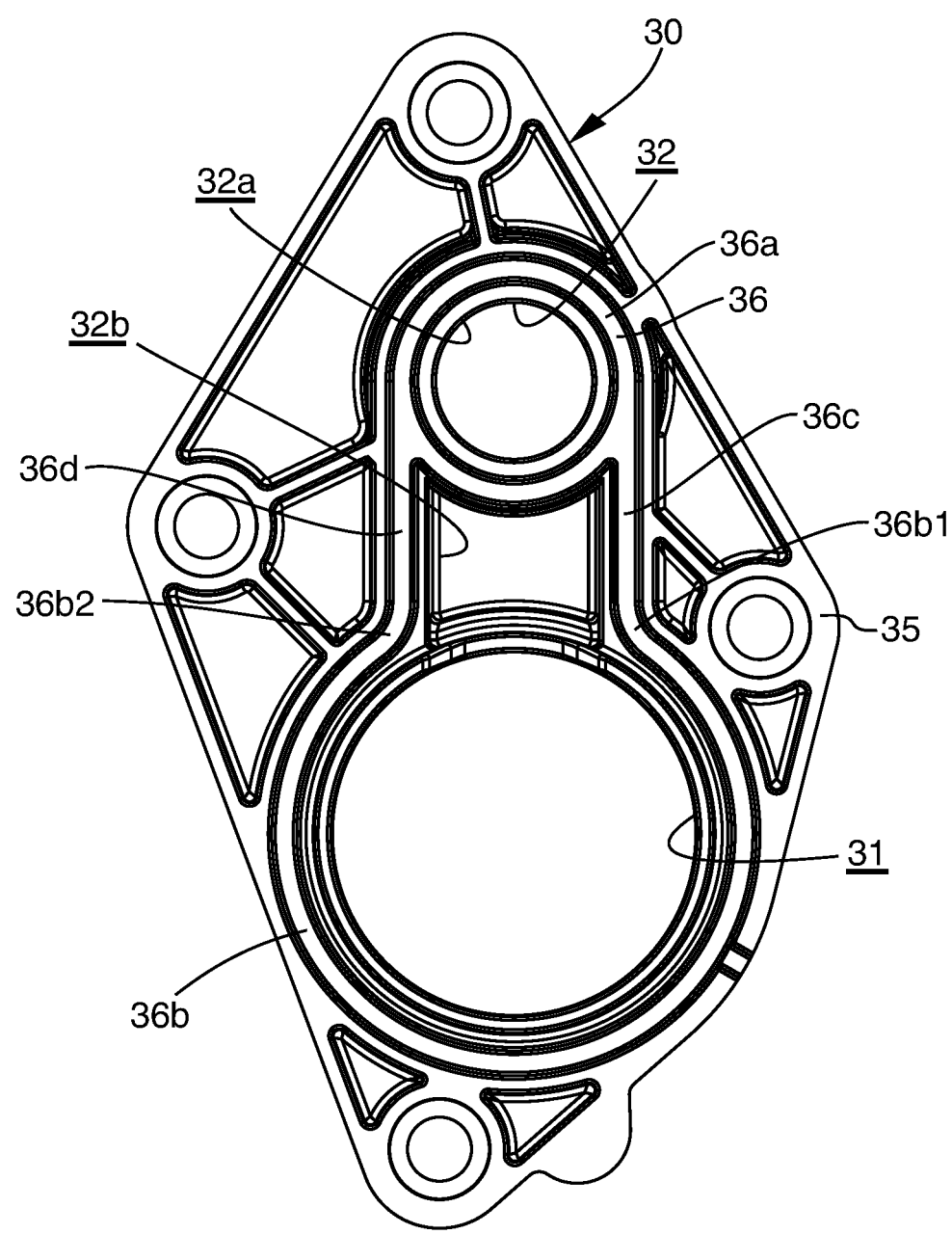
FIG. 7 is an enlarged rear view of the flange of the turbocharger according to the first embodiment of the present invention.

The flange 30 is coupled to the compressor housing 20 using a bolt (not shown). As illustrated in FIG. 7, the flange 30 has a surface 35 opposing the compressor housing 20 and a groove 36 into which the seal 50 is fitted and is formed at the surface 35.

The groove 36 has a small-diameter groove portion 36a, a large-diameter groove portion 36b, a first connecting groove portion 36c and a second connecting groove portion 36d.

The small-diameter groove portion 36a is formed at a surrounding portion of the bypass-upstream passage 32a. The small-diameter groove portion 36a is formed continuously over an entire circumference thereof. The large-diameter groove portion 36b is formed at a surrounding portion of the internal passage 31 of the flange 30. The large-diameter groove portion 36b has a form ("C" form) obtained by cutting off a portion of a circumference thereof. A diameter of the large-diameter groove portion 36b is larger than that of the small-diameter groove portion 36a. The first connecting groove portion 36c is formed at one side of the bypass-downstream passage 32b. The first connecting groove portion 36c is connected to a first portion of the small-diameter groove portion 36a and one circumferential end 36b1 of the large-diameter groove portion 36b. The second connecting groove portion 36d is formed at the other side of the bypass-downstream passage 32b. The second connecting groove portion 36d is connected to a second portion of the small-diameter groove portion 36a and the other circumferential end 36b2 of the large-diameter groove portion 36.

Figure 8:
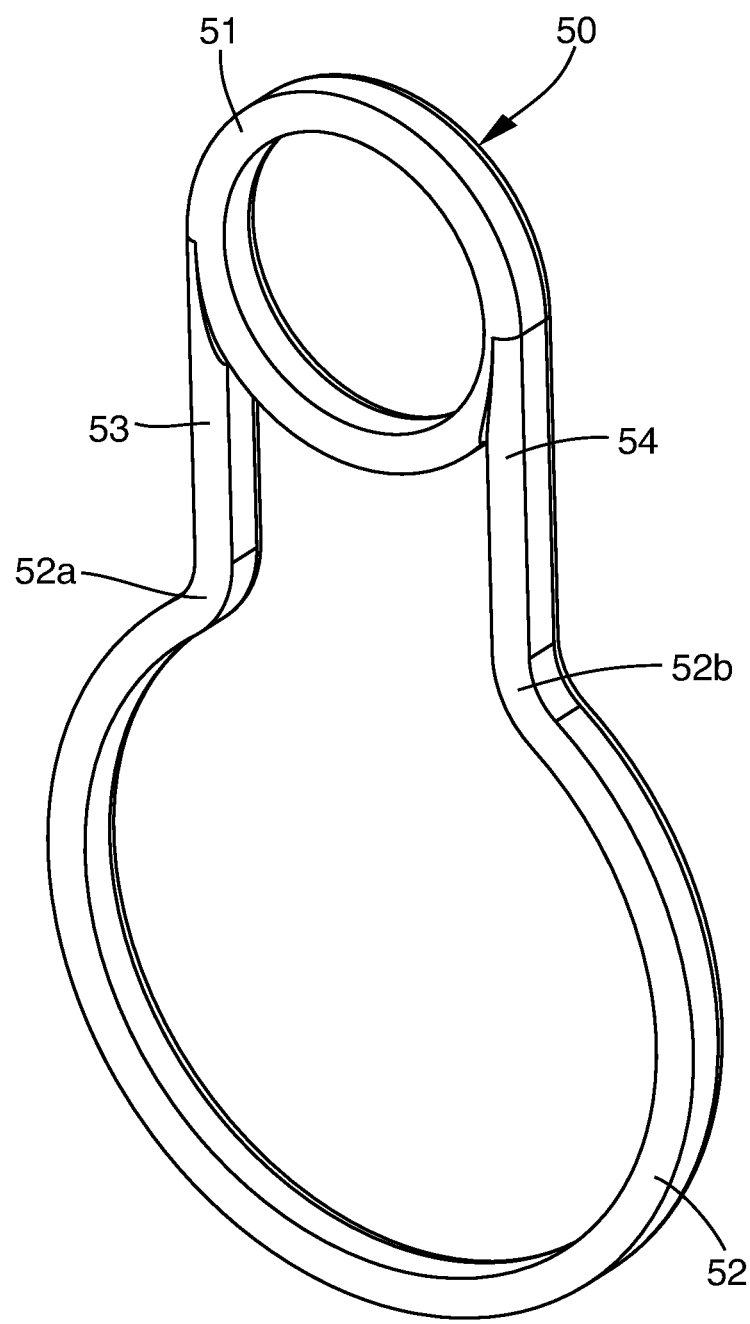
FIG. 8 is an enlarged perspective view of the seal of the turbocharger according to the first embodiment of the present invention.
Figure 9:
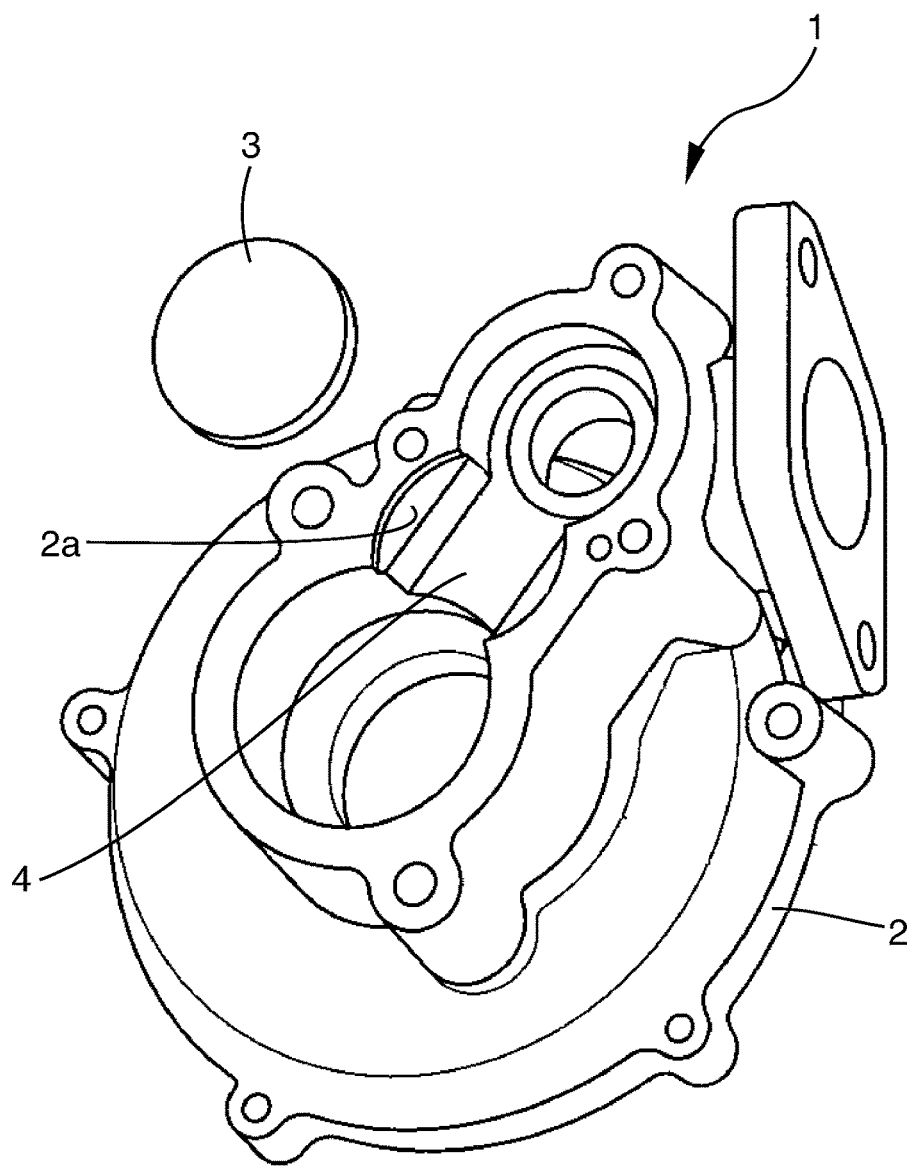
FIG. 9 is a perspective view of a compressor housing of a conventional turbocharger where parts are decoupled from each other.
Figure 10:
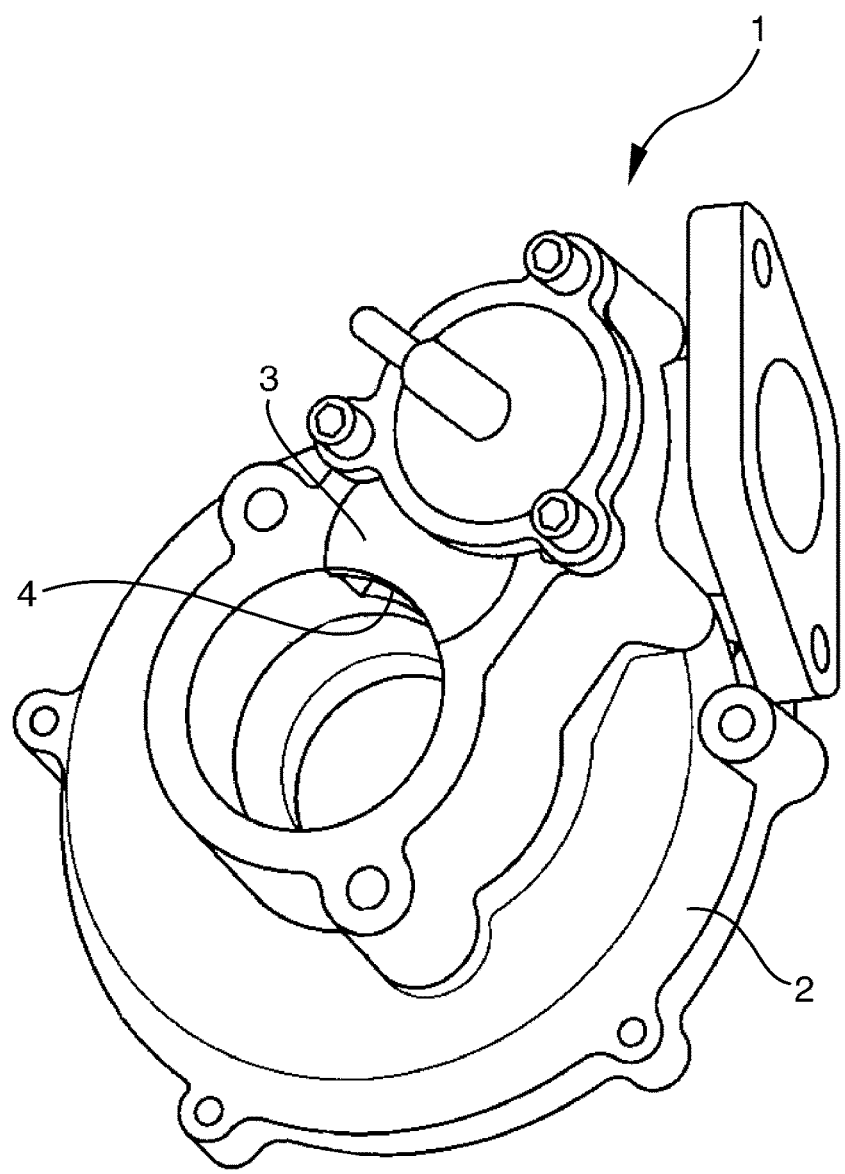
FIG. 10 is a perspective view of the compressor housing of the conventional turbocharger.

The seal 50 is provided in order to ensure a tight seal of the flange 30 and the compressor housing 20. The seal 50 is, for example, made from rubber and is an injection molded member. As illustrated in FIG. 8, the seal is molded to a single, integral member. The shape of the seal 50 corresponds to that of the groove 36. The seal 50 is fitted into the groove 36. The seal 50 has a small-diameter seal portion 51 fitted into the small-diameter groove portion 36a, a large-diameter seal portion 52 fitted into the large-diameter groove portion 36b, a first connecting seal portion 53 fitted into the first connecting groove portion 36c and a second connecting seal portion 54 fitted into the second connecting groove portion 36d.

The small-diameter seal portion 51 is provided continuously over an entire circumference thereof. The large-diameter seal portion 52 has a form ("C" form) obtained by cutting off a portion of a circumference thereof. A diameter of the large-diameter seal portion 52 is larger than that of the small-diameter seal portion 51. The first connecting seal portion 53 is connected to a first portion of the small-diameter seal portion 51 and one circumferential end 52a of the large-diameter seal portion 52. The second connecting seal portion 54 is connected to a second portion of the small-diameter seal portion 51 and the other circumferential end 52b of the large-diameter seal portion 52.

As illustrated in FIG. 2, the seal 50 contacts a contact surface 29 provided at the compressor housing 20. The contact surface 29 opposes to the surface 35 of the flange 30. The contact surface 29 is a flat surface. The contact surface 29 is made flat by machining.

Next, effects and technical advantages of certain embodiments of the present invention will be explained.

(A) Since the groove 36 is formed at the surface 35 of the flange 30 opposing the compressor housing 20 and the seal 50 is fitted into the groove 36, the tight seal of the flange 30 and the compressor housing 20 can be ensured by the seal 50. Therefore, a tight seal of the turbocharger 10 can be ensured easier than in a case where the seal is not provided.

(B) Since the groove 36 has the small-diameter groove portion 36a, the large-diameter groove portion 36b, the first connecting groove portion 36c and the second connecting groove portion 36*d* and the seal 50 is fitted into the groove 36, the tight seal of the flange 30 and the compressor housing 20 can be ensured.

(C) Since the seal 50 is molded to a single, integral member, manufacturing costs can be decreased compared with a case where the seal 50 is composed of a plurality of parts.

(D) Since the flange 30 has the cylindrical portion 33 inserted into the upstream passage 23 of the compressor housing 20, the flange 30 can be easily positioned to a predetermined position relative to the compressor housing 20 by using the cylindrical portion 33.

(E) Since the notch 33*b* is formed at the cylindrical portion 33, the bypass passage 32 and the internal space 33*a* of the cylindrical portion 33 can be connected to each other through the notch 33*b*.

(F) Since the air bypass valve 40 is coupled only to the flange 30, the tight seal of the turbocharger 10 can be ensured easier than in a case where the air bypass valve 40 is coupled to not only the flange 30 but also the compressor housing 20.

(G) Since the contact surface 29 of the compressor housing 20 is a flat surface, the tight seal of the flange 30 and the compressor housing 20 can be easily ensured by the seal 50.

(H) Since the upstream passage 23 of the compressor housing 20 and the connecting passage 28 of the compressor housing 20 extend in the same direction D1 and open to the flange 30 side, it is possible to suppress the connecting passage 28 from having an undercut shape when the compressor housing 20 is molded. Therefore, manufacturing costs of the compressor housing 20 can be decreased.

(I) Since the bypass passage 32 which is connected to the downstream passage 24 and the upstream passage 23 is provided at the flange 30, the turbocharger 10 can be downsized compared with a case where a hose for the bypass passage is used.

(J) Since the flange 30 is coupled to the compressor housing 20 using the bolt (not shown), the flange 30 can be coupled to the compressor housing 20 easier than in a case where the flange 30 is welded to the compressor housing 20.

(K) Since the air bypass valve 40 is coupled to the flange 30 using the bolt 41, the air bypass valve 40 can be coupled to the flange 30 easier than in a case where the air bypass valve 40 is welded to the flange 30.

What is claimed is:

1. A turbocharger comprising: a compressor housing, a flange, an air bypass valve and a seal, wherein
   the compressor housing has an impeller housing having a space where an impeller is disposed, an upstream passage positioned upstream of the impeller housing and a downstream passage positioned downstream of the impeller housing,
   the flange is coupled to the compressor housing and has an internal passage positioned upstream of the upstream passage of the compressor housing and a bypass passage connected to the downstream passage of the compressor housing and the upstream passage of the compressor housing,
   the air bypass valve is coupled only to the flange so as to be able to open and close the bypass passage,
   the downstream passage of the compressor housing has an outlet passage and a connecting passage which is connected to the bypass passage,
   the flange has a surface opposing the compressor housing and a groove is formed at the surface,
   the seal is fitted into the groove,
   the bypass passage has a bypass-upstream passage connected to the connecting passage of the compressor housing and a bypass-downstream passage located radially outside the bypass-upstream passage and connected to the upstream passage of the compressor housing, and
   the groove has a small-diameter groove portion, a large-diameter groove portion, a first connecting groove portion and a second connecting groove portion, the small-diameter groove portion formed at a surrounding portion of the bypass-upstream passage and formed continuously over an entire circumference thereof, the large-diameter groove portion formed at a surrounding portion of the internal passage of the flange and having a form obtained by cutting off a portion of a circumference thereof, the first connecting groove portion formed at one side of the bypass-downstream passage and connected to a first portion of the small-diameter groove portion and one circumferential end of the large-diameter groove portion, the second connecting groove portion formed at the other side of the bypass-downstream passage and connected to a second portion of the small-diameter groove portion and the other circumferential end of the large-diameter groove portion.

2. The turbocharger according to claim 1, wherein the seal has a small-diameter seal portion fitted into the small-diameter groove portion, a large-diameter seal portion fitted into the large-diameter groove portion, a first connecting seal portion fitted into the first connecting groove portion and a second connecting seal portion fitted into the second connecting groove portion, and
   wherein the seal is molded to a single, integral member.

3. The turbocharger according to claim 1, wherein the flange has a cylindrical portion inserted into the upstream passage of the compressor housing and having an internal space connected to the internal passage of the flange.

4. The turbocharger according to claim 3, wherein a notch is formed at a portion of the cylindrical portion in a circumferential direction of the cylindrical portion.

5. The turbocharger according to claim 1, wherein the compressor housing has a contact surface to which the seal is contacted, and
   wherein the contact surface is a flat surface.

6. The turbocharger according to claim 1, wherein the upstream passage of the compressor housing and the connecting passage of the compressor housing extend in a same direction and open to a side of the flange.

* * * * *